(12) United States Patent
Huynh et al.

(10) Patent No.: US 8,040,699 B2
(45) Date of Patent: Oct. 18, 2011

(54) SECONDARY SIDE CONSTANT VOLTAGE AND CONSTANT CURRENT CONTROLLER

(75) Inventors: Steven Huynh, Sunnyvale, CA (US); Zhibo Tao, San Jose, CA (US); David J. Kunst, Cupertino, CA (US); Matthew Grant, Palo Alto, CA (US)

(73) Assignee: Active-Semi, Inc. (VG)

( * ) Notice: Subject to any disclaimer, the term of this patent is extended or adjusted under 35 U.S.C. 154(b) by 688 days.

(21) Appl. No.: 11/825,972

(22) Filed: Jul. 9, 2007

(65) Prior Publication Data

US 2009/0016086 A1    Jan. 15, 2009

(51) Int. Cl.
*H02M 3/335* (2006.01)
*H02M 3/338* (2006.01)

(52) U.S. Cl. ............... 363/21.15; 363/21.07; 363/56.11; 361/18; 361/90

(58) Field of Classification Search ............... 363/21.07, 363/21.12, 21.15, 56.11, 147, 21.14, 127; 361/18, 90, 91.1, 91.2, 92; 323/276, 277
See application file for complete search history.

(56) References Cited

U.S. PATENT DOCUMENTS

| | | | |
|---|---|---|---|
| 5,291,386 A * | 3/1994 | Wu | 363/21.05 |
| 5,313,381 A | 5/1994 | Balakrishnan | 363/147 |
| 5,729,443 A * | 3/1998 | Pavlin | 363/21.12 |
| 6,229,366 B1 * | 5/2001 | Balakirshnan et al. | 327/172 |
| 6,429,709 B1 * | 8/2002 | Hall et al. | 327/175 |
| 6,775,164 B2 * | 8/2004 | Wong et al. | 363/147 |

OTHER PUBLICATIONS

AP4300 Data Sheet, "Dual Op Amp and Voltage Reference," Advanced Analog Circuits, BCD Semiconductor Manufacturing Limited, Apr. 2005 Rev. 1.2; 12.
"TSM1052: CC/CV controller for chargers and adapters" application note, STMicroelectronics, Feb. 2007, from www.st.com/powermanagement; 2 pages.
TSM1011 Data Sheet, "Constant Voltage and Constant Current Controller for Battery Chargers and Adaptors," Advance Data, STMicroelectronics, Feb. 2003, from www.datasheetcatalog.com; 9 pages.
TSM1051 Data Sheet, "Constant Voltage and Constant Current Controller for Battery Chargers and Adaptors," STMicroelectronics, Jan. 2002, from www.datasheetcatalog.com; 10 pages.

* cited by examiner

*Primary Examiner* — Gary L Laxton
*Assistant Examiner* — Nusrat Quddus
(74) *Attorney, Agent, or Firm* — Imperium Patent Works; T. Lester Wallace; Darien K. Wallace (57) ABSTRACT

A low-cost integrated circuit is used as a secondary side constant voltage and constant current controller. The integrated circuit has four terminals and two amplifier circuits. A first amplifier circuit is used to sense a voltage on a FB terminal and in response to cause a first current to flow through an OPTO terminal. A second amplifier circuit is used to sense a voltage between a SENSE terminal and a SOURCE terminal and in response to cause a second current to flow through the same OPTO terminal. The FB terminal is used for output voltage feedback and is also used to supply power onto the integrated circuit. The SOURCE terminal is used for output current feedback and is also used as power supply return for the integrated circuit. The cost of the integrated circuit is reduced by having only four terminals.

21 Claims, 5 Drawing Sheets

SECONDARY SIDE CONSTANT VOLTAGE AND CONSTANT CURRENT CONTROLLER

TECHNICAL FIELD

The disclosed embodiments relate to the field of power conversion, more specifically, to switch mode power supply circuits that regulate output voltage and current.

BACKGROUND INFORMATION

Figure 1:
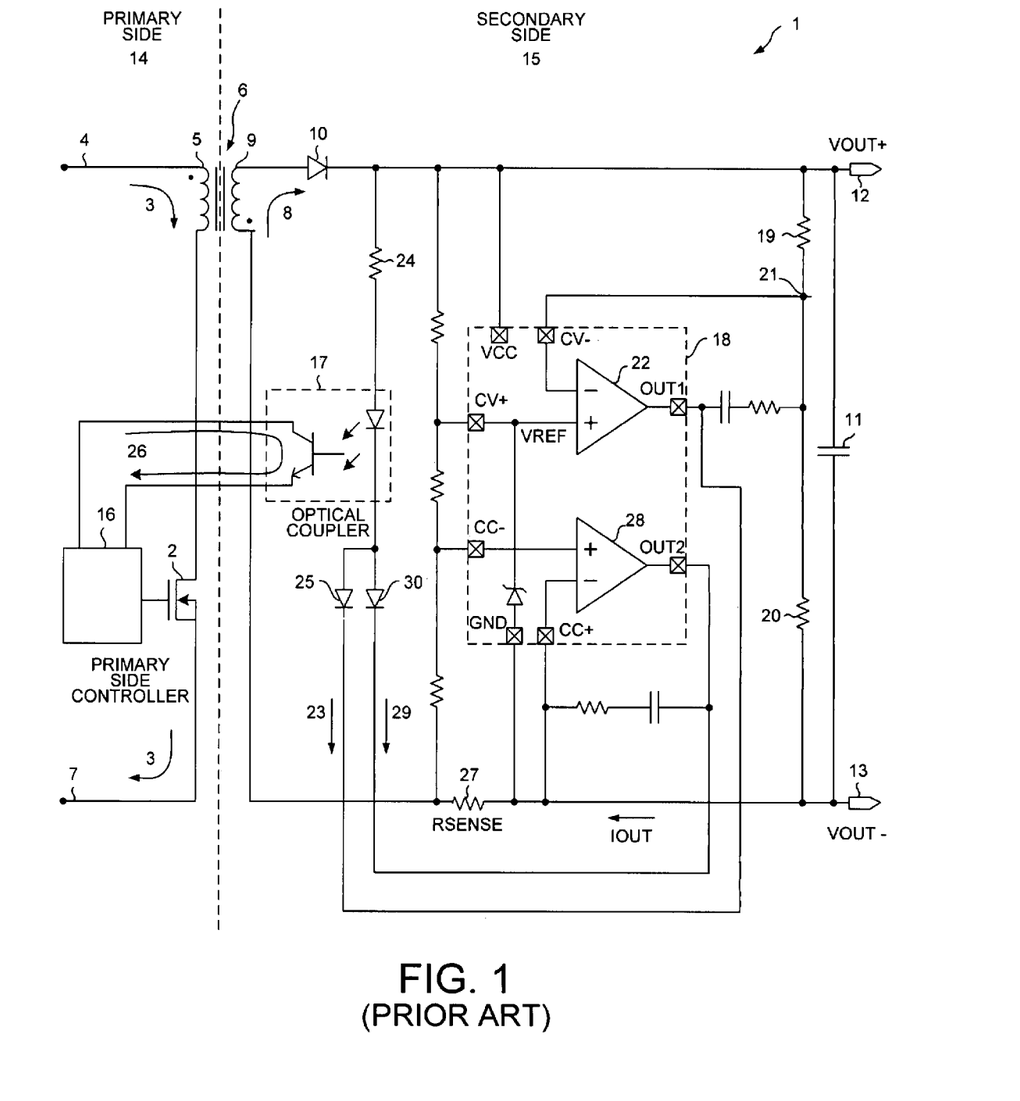
FIG. 1 (Prior Art) is a block diagram of a secondary side controlled flyback converter using a conventional constant voltage and constant current controller that has eight terminals.

A circuit known as a flyback converter is a switch mode power supply circuit commonly used in applications such as AC-to-DC wall adapter power supplies and battery chargers. FIG. 1 (Prior Art) is a block diagram of a simple flyback converter 1. Flyback converter 1 operates by repeatedly closing and opening a switch 2. Closing switch 2 causes a current 3 to flow from a first input node 4, through a primary 5 of a transformer 6, through the switch 2, and to a second input node 7. In one example, a rough DC voltage is present between the first and second input nodes 4 and 7. An alternating current (AC) line voltage may, for example, be rectified by a full wave bridge rectifier (not shown) and an associated smoothing capacitor (not shown) so that the rectified and smoothed rough DC voltage is present between the first and second input nodes 4 and 7.

When switch 2 is closed, the current 3 that flows through primary 5 causes energy to be stored in transformer 6. Switch 2 is then opened. When switch 2 is opened, energy stored in transformer 6 is transferred to the output of converter 1 in the form of a pulse of current 8 that flows through a secondary 9 of transformer 6 and through a diode 10. In FIG. 1, an output capacitor 11 is connected across output terminals 12 and 13 of the converter. The pulse of current 8 charges capacitor 11. In steady state operation in a constant voltage mode, switch 2 is switched to open and close rapidly and in such a manner that the output voltage VOUT on output capacitor 11 remains substantially constant.

Flyback converter 1 of FIG. 1 is considered in further detail. Flyback converter 1 includes a primary side 14 and a secondary side 15. Primary side 14 includes a primary side controller integrated circuit 16, the switch 2, and the primary 5 of transformer 6. Secondary side 15 includes the secondary 9 of transformer 6, an optocoupler 17, a secondary side constant voltage (CV) and constant current (CC) controller integrated circuit 18, the rectifying diode 10, the output capacitor 11, and a few other discrete components. Secondary side controller 18 is an integrated circuit packaged in an IC package with eight terminals.

In the constant-voltage (CV) operational mode, the output voltage VOUT across output terminals 12 and 13 is sensed by a resistor divider. The resistor divider includes resistor 19 and 20. The center tap 21 of the resistor divider is coupled to terminal CV– of integrated circuit 18 and within integrated circuit 18 to a non-inverting input lead of a voltage control amplifier 22. The voltage control amplifier 22 compares the voltage on the center tap of the divider input to a reference voltage VREF and outputs the result of the comparison onto terminal OUT1 of integrated circuit 18. If the result of the comparison causes the voltage on terminal OUT1 to be low, then a current 23 is pulled through the optocoupler 17. The current 23 flows through current limiting resistor 24, through optocoupler 17, through a blocking diode 25, and into terminal OUT1. When current 23 flows through optocoupler 17, the optocoupler 17 causes a corresponding current 26 to flow to the primary side controller 16. This current 26 is an error current that is indicative of the voltage level on output terminals 12 and 13. Primary side controller 16 receives the error current 26 and, based on the error current, controls the on/off duty cycle of switch 2 to regulate output voltage VOUT.

In the constant-current (CC) operational mode, the current being supplied by the power supply is sensed when it returns to secondary 9. The current, referred to as IOUT, is made to flow through a sense resistor 27. The voltage drop across sense resistor 27 is therefore indicative of the magnitude of the current IOUT. The voltage drop across sense resistor 27 is sensed by a constant current amplifier 28 within integrated circuit 18. If the voltage drop is greater than a predetermined value, then constant current amplifier 28 causes the voltage on terminal OUT2 to be low. If the voltage on terminal OUT2 is low, then a current 29 is pulled through current limiting resistor 24, optocoupler 17, and blocking diode 30. The current flow 29 through optocoupler 17 causes error current 26 to flow into primary side controller 16. Error current 26 is therefore indicative of the magnitude of the current IOUT. Based on error current 26, primary side controller 16 controls the on/off duty cycle of switch 2 to regulate output current IOUT. Flyback converter 1 either operates in the constant voltage mode or in the constant current mode, depending on the loading condition. In one example, if the IOUT output current through output terminals 12 and 13 would exceed a specified current, then converter 1 operates in the constant current mode, otherwise converter 1 operates in the constant voltage mode.

Secondary side controller integrated circuit 18 has eight terminals. There are two terminals CV– and CV+ for inputs to the constant voltage amplifier 22, and one terminal OUT1 for the output of the constant voltage amplifier 22. There are two terminals CC– and CC+ for inputs to the constant current amplifier 28, and one terminal OUT2 for the output of the constant current amplifier 28. The integrated circuit is powered via a power terminal VCC and is grounded via a ground terminal GND. Integrated circuit 18 has eight terminals.

Figure 2:
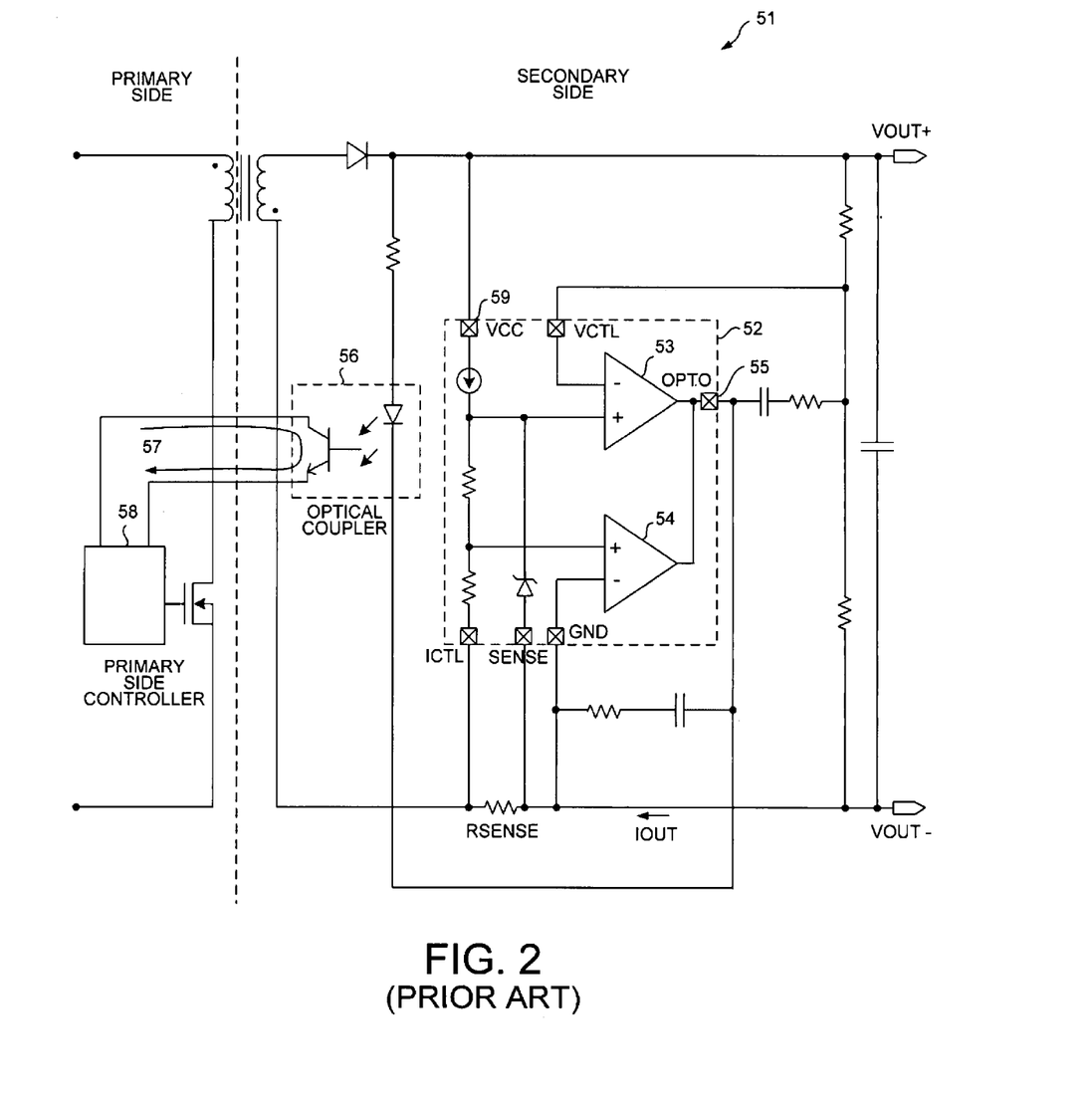
FIG. 2 (Prior Art) is a block diagram of a secondary side controlled flyback converter using a conventional constant voltage and constant current controller that has six terminals.

There are numerous secondary side CV-CC controller integrated circuits on the market. FIG. 2 (Prior Art) is a block diagram of a flyback converter 51 that employs one such conventional secondary side CV-CC controller integrated circuit 52, the TSM1011 manufactured by STMicroelectronics. The illustration of the circuitry within integrated circuit 52 is based on assumptions, and is a simplification. For accurate detailed information, contact STMicroelectronics.

The circuit of FIG. 2 has a similar topology to the circuit of FIG. 1, except that the current sinking outputs of the two amplifiers 53 and 54 are both coupled to the same output terminal OPTO 55. This makes an ORing function which ensures that whenever the current or the voltage exceeds their respective CC and CV regulation values, IREG and VREG, the optocoupler 56 will be activated. Accordingly, if amplifier 53 senses an overvoltage condition, i.e., VOUT>VREG, then amplifier 53 sinks current into terminal 55, thereby pulling an error current through optocoupler 56 and generating an associated error current 57 back to the primary side controller 58. If amplifier 54 senses an overcurrent condition, i.e., IOUT>IREG, then amplifier 54 sinks an error current into terminal 55, thereby pulling an error current through optocoupler 56 and generating an associated error current 57 back to the primary side controller 58. Integrated circuit 52 is powered via VCC terminal 59 and has six terminals: VCC, GND, VCTL, ICTL, and OPTO. Although the circuit of FIG. 2 works well, further improvements and cost reductions are desired.

SUMMARY

A low-cost integrated circuit is used as a secondary side constant voltage and constant current controller. The secondary side constant voltage and constant current controller may, for example, be the secondary side controller in a wall adapter power supply or in a battery charger. The wall adapter power supply or battery charger supplies an output voltage VOUT onto output terminals. The output voltage VOUT is regulated in a constant voltage mode of operation. The wall adapter power supply or battery charger supplies an output current IOUT to a load connected to the output terminals. The output current IOUT is regulated in a constant current mode of operation. In one example, wall adapter power supply or battery charger operates in the constant voltage mode unless the output current IOUT exceeds a predetermined current regulation value, in which case the wall adapter power supply or battery charger operates in the constant current mode.

The secondary side controller integrated circuit is packaged in a package that has four terminals. A first amplifier circuit of the integrated circuit is used to regulate constant output voltage. The first amplifier circuit senses the voltage on a feedback (FB) terminal and in response to detecting a voltage on FB which is greater than a predetermined regulated FB voltage, an overvoltage, the first amplifier circuit causes a first error current to be sunk into an OPTO terminal. This first amplifier is operational in the constant voltage mode of operation. A second amplifier circuit of the integrated circuit is used to regulate constant output current. The second amplifier circuit senses a voltage between a SENSE terminal and a SOURCE terminal, which is indicative of the magnitude of the output current IOUT of the power supply or battery charger because a sense resistor is connected across these two terminals. The sense resistor is in the return path of the output current IOUT. In response to detecting a voltage between the SENSE and SOURCE terminals which is greater than a predetermined threshold voltage, the second amplifier circuit causes a second error current to be sunk into the OPTO terminal. This second amplifier is operational in the constant current mode of operation.

In one advantageous aspect, the FB terminal is used to sense the magnitude of the output voltage VOUT and is also used to receive supply current into the integrated circuit. In another advantageous aspect, the SOURCE terminal is used to sense the magnitude of the output current IOUT and is also used as power supply current return for the integrated circuit. Furthermore, the first amplifier circuit and the second error amplifier circuit share the same OPTO terminal as their common current sink output. The cost of the integrated circuit is reduced by having only four terminals: FB, OPTO, SENSE and SOURCE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 3:
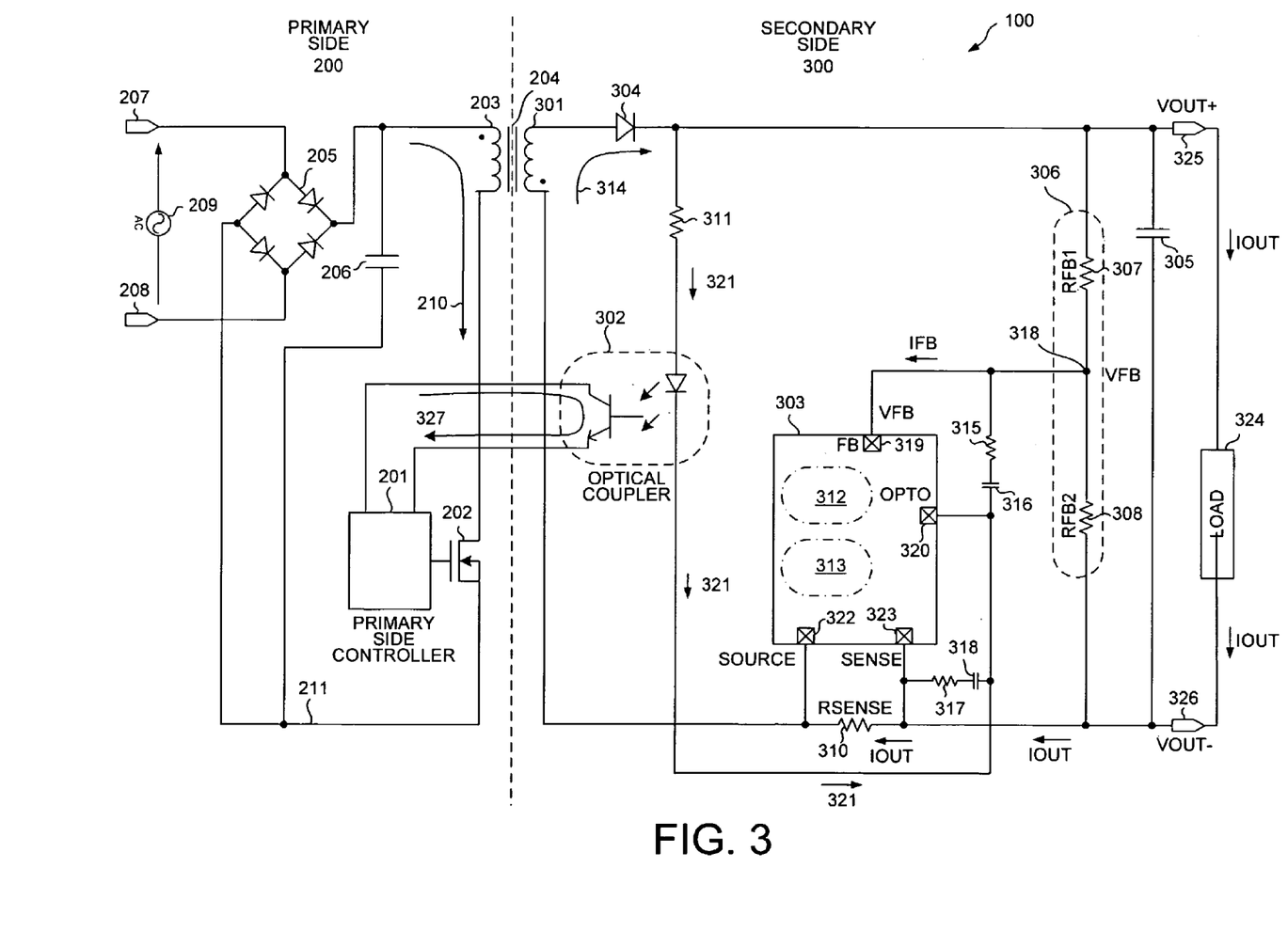
FIG. 3 is a block diagram of a novel secondary side controlled flyback converter 100 in accordance with one novel aspect.

FIG. 3 is a block diagram of a secondary side controlled flyback converter 100 in accordance with one novel aspect. Flyback converter 100 includes a primary side 200 and a secondary side 300. Primary side 200 includes a primary side controller integrated circuit 201, a primary side main switch 202, a primary 203 of a transformer 204, a full wave Rectifier Bridge 205, and an input capacitor 206. Secondary side 300 includes a secondary 301 of transformer 204, an optocoupler 302, a novel secondary side constant voltage and constant current controller integrated circuit 303, a secondary side rectifier 304, and an output capacitor 305. Secondary side 300 also includes a feedback voltage divider network 306 formed by resistors 307 and 308, a sense resistor 310, and a resistor 311 to limit current through optocoupler 302. Secondary side constant voltage and constant current controller 303 includes a voltage control amplifier circuit 312 and a current control amplifier circuit 313. Capacitor-resistor network 315/316 is a compensation network for amplifier circuit 312, and capacitor-resistor network 317/318 is a compensation network for amplifier circuit 313.

In operation, an alternating current (AC) line voltage, for example 110 volts AC, is received onto primary input terminals 207 and 208. This line input voltage is represented by AC voltage source symbol 209. The line input voltage signal is full wave rectified by Rectifier Bridge 205 and the resulting rectified signal is smoothed by input capacitor 206. For purposes of explanation here, what is referred to as a rough DC voltage is therefore present across input capacitor 206.

When primary side main switch 202 is conductive (i.e., on), a current 210 is drawn from one plate of capacitor 206, through primary 203 of transformer 204, and through switch 202 to node 211 and the other plate of capacitor 206. This current flow causes energy to be stored in transformer 204. When primary side main switch 202 is turned off, energy is transferred into secondary 301 to the output of the converter in the form of a pulse of current 314. Current 314 places charge into output capacitor 305 and raises the voltage on output capacitor 305. Primary side controller 201 repeatedly switches switch 202 on and off and controls the on/off duty cycle of switch 202 such that either an output voltage VOUT on capacitor 305 or an output current IOUT flowing out of the converter is regulated. Output current IOUT is illustrated flowing through an external load 324.

Load 324 may, for example, be a rechargeable battery that is being charged. Which one of the output voltage VOUT or the output current IOUT is regulated depends on the operating mode of converter 100. If converter 100 is operating in a constant voltage (CV) mode, then VOUT is regulated to have a maximum regulated voltage value VREG (for example, five volts). If, on the other hand, converter 100 is operating in a constant current (CC) mode, then IOUT is regulated to output a maximum regulated current value IREG (for example, one ampere). Which mode converter 100 operates in depends on the amount of current being delivered to the load. If the load demands a current that exceeds a predetermined current limit, or IREG, then converter 100 operates in the constant current mode, otherwise converter 100 operates in the constant voltage mode. In a battery charger application, when the battery voltage is less than VREG (the predetermined full-charge battery voltage) the circuit will supply a regulated constant output current, IREG. As the battery charges up to its full-charge regulation voltage, the charge current will decrease and the circuit will transition from the constant current (CC) mode, to the constant voltage (CV) mode.

Figure 4:
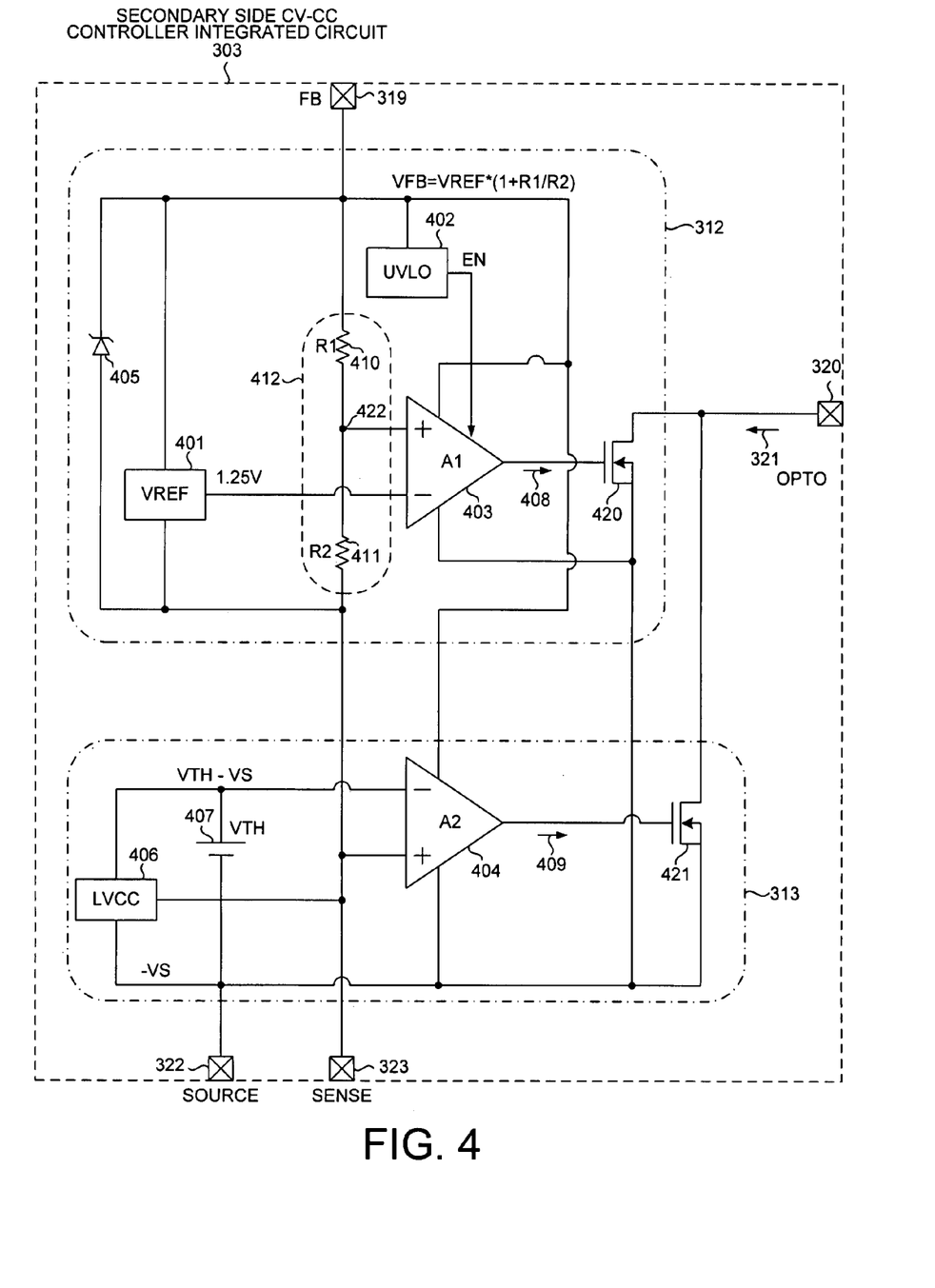
FIG. 4 is a detailed block diagram of a novel secondary side constant voltage and constant current controller 303 of the flyback converter 100 of FIG. 3.

FIG. 4 is a more detailed block diagram of the novel secondary side constant voltage and constant current controller integrated circuit 303 of FIG. 3. Amplifier circuit 312 includes an error amplifier 403, a reference voltage generator 401, an under-voltage-lock-out (UVLO) circuit 402, a shunt device 405, a resistor divider network 412 formed by resistors 410 and 411, and an N-channel field effect transistor (NFET) 420. Amplifier circuit 313 includes an error amplifier 404, a low-voltage current control (LVCC) circuit 406, a reference voltage generator circuit 407, and an NFET 421.

Constant Voltage Mode:

If converter 100 is operating in the constant voltage mode, then a resistor divider 306 (see FIG. 3) is used to sense the output voltage VOUT between converter output terminals 325 and 326. A fraction of VOUT is present on tap 318 of the voltage divider, and this fractional voltage is supplied onto the feedback terminal FB 319 of secondary side integrated circuit 303. As illustrated in FIG. 4, this voltage on terminal 319 is in turn voltage-divided on-chip by voltage divider 412. The center tap 422 of voltage divider 412 is coupled to the non-inverting input lead of error amplifier 403. Resistances 307, 308, 410 and 411 are selected such that if VOUT has a magnitude of the voltage to be regulated (for example, five volts), then the voltage on the non-inverting input lead of error amplifier 403 is at the reference voltage VREF output by reference voltage generator 401. The output of reference voltage generator 401 is coupled to the inverting input lead of error amplifier 403. Accordingly, if the output voltage VOUT on terminals 325 and 326 has a magnitude greater than five volts, then the voltage on the non-inverting input lead of error amplifier 403 is greater than the VREF voltage on the inverting input lead of error amplifier 403. Error amplifier 403 outputs a high error signal 408 that turns on NFET 420. NFET 420 is conductive and sinks a current 321 (see FIG. 3) into OPTO terminal 320 of the secondary side integrated circuit 303. This current 321 flows through current limiting resistor 311, through optocoupler 302, and into the OPTO terminal 320 of the secondary side integrated circuit 303, through conductive NFET 420, and to SOURCE terminal 322. This current 321 flowing through optocoupler 302 causes a corresponding current signal 327 to flow through the optocoupler 302 and to the primary side controller 201. In response to receiving this signal, primary side controller 201 decreases the duty cycle with which switch 202 is switched, or otherwise controls switch 202, such that less energy is transferred per unit time through transformer 204 to the secondary side and such that the voltage on output capacitor 305 is regulated at the maximum voltage VREG.

In the constant voltage mode, VOUT can be expressed as:

$$VOUT = VFB*(1+RFB1/RFB2) + IFB*RFB1 \tag{1}$$

where VFB is the voltage on FB terminal 319, IFB is the nominal bias current flow into FB terminal 319, RFB1 is the resistance of resistor 307, and RFB2 is the resistance of resistor 308.

As illustrated in FIG. 4, the inverting input lead of error amplifier 403 is coupled to receive VREF. The non-inverting input of error amplifier 403 is coupled to the middle of resistor divider network 412. Error amplifier 403 senses the voltage on the non-inverting input lead and forces it to be substantially the same as the voltage on the inverting input lead. Therefore, voltage VFB can be expressed as:

$$VFB = VREF*(1+R1/R2) \tag{2}$$

where VREF is the reference voltage provided by reference voltage generator 401, R1 is the resistance of resistor 410, and R2 is the resistance of resistor 411.

In one example of CV mode operation, reference voltage generator 401 is a bandgap circuit which provides a reference voltage VREF of 1.25 volts. R1 and R2 are internally selected such that R1/R2 is equal to 2.2. RFB1 and RFB2 are selected to be 1K ohm and 4 k ohms respectively. Therefore, VFB is equal to four volts according to Equation (2), and VOUT is equal to five volts according to Equation (1) assuming bias current IFB is negligible. If VOUT is higher than five volts, then voltage VFB is also higher than four volts, and the voltage on the non-inverting input lead of error amplifier 403 is higher than VREF 1.25 volts. Under such a condition, error amplifier 403 outputs error signal 408 and causes current 321 to be sunk into OPTO terminal 320. As described above, this causes primary side controller 201 to change the on-off duty cycle of primary side main switch 202. As a result, VOUT is regulated to 5.0 volts.

Constant Current Mode:

If converter 100 is operating in the constant current (CC) mode, then sense resistor 310 (see FIG. 3) is used to sense the output current IOUT. Sense resistor 310 is in the return path of the output current IOUT on its way back to the secondary 301. The magnitude of the voltage dropped across sense resistor 310 is therefore indicative of the magnitude of the output current IOUT. One node of sense resistor 310 is coupled to terminal SENSE 323 of secondary side integrated circuit 303 whereas the other node of sense resistor 310 is coupled to terminal SOURCE 322 of secondary side integrated circuit 303. As illustrated in FIG. 4, terminal SENSE 323 is coupled to the non-inverting input lead of error amplifier 404. The voltage on terminal SOURCE 322 is level shifted by reference voltage generator 407 and is supplied to the inverting input lead of error amplifier 404. Accordingly, if the voltage drop from the SENSE terminal to the SOURCE terminal is less than the reference voltage VTH, then error amplifier 404 outputs a high signal 409 which makes NFET 421 conductive. The resistance RSENSE of sense resistor 310 is selected such that the error amplifier 404 outputs a high signal 409 when the output current IOUT exceeds the CC regulation current, IREG. NFET 421 is conductive and sinks the current 321 into the OPTO terminal 320 of the secondary side integrated circuit 303. This current 321 flows through current limiting resistor 311, through optocoupler 302, and into the OPTO terminal 320 of the secondary side integrated circuit 303, through conductive NFET 421, and to SOURCE terminal 322. This current 321 flowing through optocoupler 302 causes current signal 327 to flow through the optocoupler 302 and to the primary side controller 201. In response to receiving this signal, primary side controller 201 decreases the duty cycle with which switch 202 is switched, or otherwise controls switch 202, such that less energy is transferred per unit time through transformer 204 to the secondary side and such that the current IOUT flowing through sense resistor 310 is regulated at IREG. In the constant current mode, IOUT can be expressed as:

$$IOUT = VTH/RSENSE \tag{3}$$

where VTH is the threshold voltage provided by reference voltage generator 407, and RSENSE is the resistance of sense resistor 310.

In one example of CC mode, VTH is equal to two hundred millivohms and RSENSE is equal to two hundred milliohms. IOUT is therefore regulated to be equal to one ampere. If IOUT is larger than one ampere, then the voltage on the inverting input of error amplifier 404 is lower than voltage on the non-inverting input of error amplifier 404. Under such a condition, error amplifier 404 outputs the error signal 409 and causes current 321 to be sunk into OPTO terminal 320. As described above, this causes primary side controller 201 to change the on-off duty cycle of primary side main switch 202. As a result, IOUT is regulated to the maximum limit of one ampere.

Ideally, converter 100 operates such that output voltage VOUT is at a constant output voltage VREG in constant voltage (CV) mode and such that the output current IOUT is at a constant output current IREG in constant current (CC) mode. In the CV mode, IOUT is generally less than IREG and the voltage across sense resistor 310 is lower than the reference voltage (VTH) of reference voltage generator 407. As a result, NFET 421 remains OFF in the CV mode. On the other hand, in the CC mode, VOUT is less than VREG and the voltage on the non-inverting input lead of error amplifier 403 is lower than the voltage on the inverting input lead of error amplifier 403. Error amplifier 403, if enabled, will output a low signal and NFET 420 will be nonconductive. Therefore, the CV mode and the CC mode are two substantially independent operational modes and are able to share a common OPTO terminal 320. UVLO circuit 402 is provided to ensure, during power up, that error amplifier 403 is not enabled unless VOUT is high enough that error amplifier 403 will work correctly.

Terminals of Secondary Side IC:

In one advantageous aspect, FB terminal 319 is not only used to sense the magnitude of the output voltage VOUT during constant voltage mode operation, but FB terminal 319 is also used as a power supply terminal for powering secondary side controller 303. FB terminal 319 is used as a power supply terminal to power reference voltage generator 401, UVLO circuit 402, error amplifier 403, error amplifier 404, reference voltage generator 407, and low-voltage current control (LVCC) circuit 406. In the example set forth above, VFB is equal to four volts in CV regulation mode, which results in an internal power supply voltage that is higher than the minimum internal power supply voltage that is required for the circuitry of integrated circuit 303 to operate. Integrated circuit 303 operates correctly under conditions in which VOUT is as low as 2.0 volts and VFB is therefore 1.6 volts in this example. By using FB terminal 319 for both output voltage feedback and for receiving supply power, one less terminal is needed on the package of secondary side controller 303. The packaged secondary side controller integrated circuit 303 has only four terminals: FB, OPTO, SOURCE, and SENSE.

As illustrated in Equation (1), bias current IFB contributes a small error to output voltage VOUT. However, IFB can be designed to be relatively small as compared to the current that flows through RFB2 resistor 308. Furthermore, IFB can be designed to have a substantially zero temperature coefficient. In one example, IFB has a value of one hundred microamperes with a total variation of plus or minus twenty-five microamperes over process, temperature and voltage. With a resistance value of 1K ohm for RFB1 and a voltage of five volts for VOUT, the error contribution to VOUT due to IFB is plus or minus twenty five millivolts (plus or minus 0.5 percent). This error is tolerable in most applications, including off-line chargers and power adapters.

Figure 5:
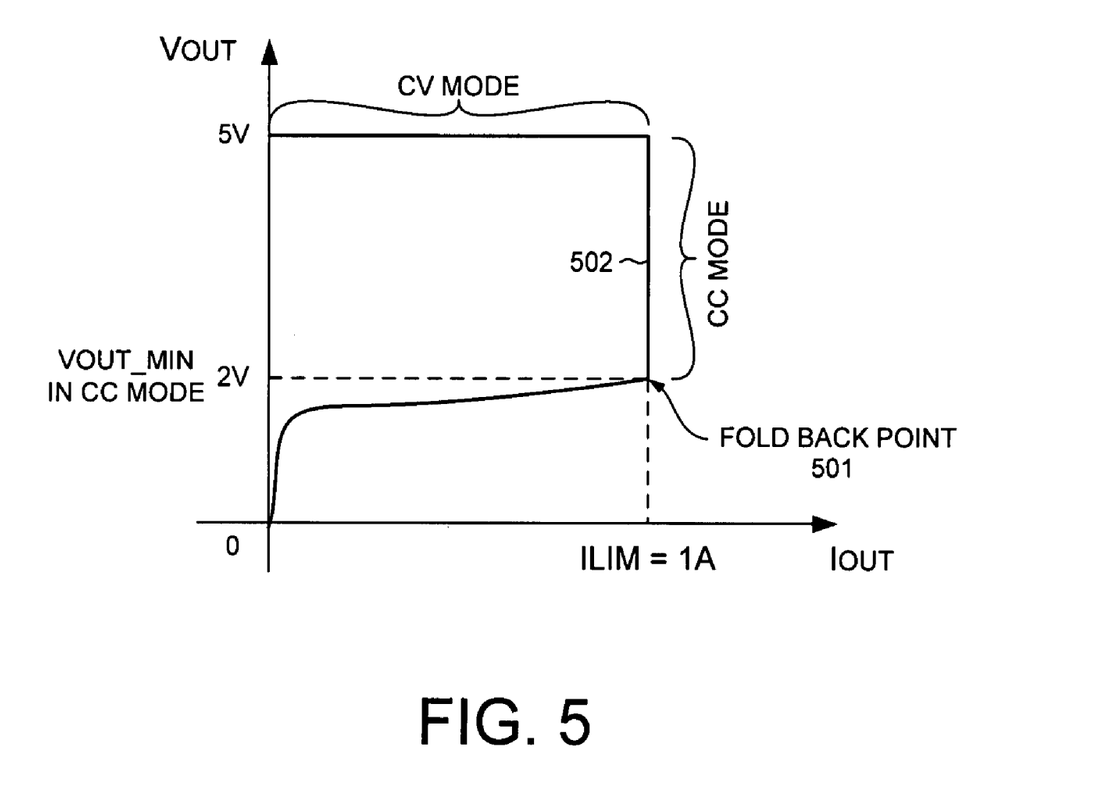
FIG. 5 is a diagram of a idealized VOUT-IOUT curve for the flyback converter of FIG. 3 when the flyback converter is used to charge a discharged battery.

FIG. 5 illustrates an idealized VOUT-IOUT curve for converter 100 of FIG. 3 when the converter 100 is operating as a five watt off-line CV/CC battery charger having a 5.0 volt CV mode output voltage and a 1.0 ampere CC mode output current. VOUT_MIN is the minimal output voltage at which converter 100 can regulate IOUT to be constant. The point 501 on the VOUT-IOUT curve where VOUT equals VOUT_MIN is also called a foldback point. If a discharged battery represented by load 324 in FIG. 3 is connected to converter 100 and the converter begins operation, then IOUT flowing into the discharged battery is regulated to its IREG value of one amperes and converter 100 operates in the constant current mode. The voltage of the battery increases along the vertical line 502 in FIG. 5. When the battery voltage reaches the UVLO voltage, UVLO device 402 enables error amplifier 403. As the battery charges up and approaches its predetermined full-charge regulation voltage, VREG, the charge current decreases. When the charge current decreases below the CC regulation current, IREG, the converter 100 then enters into the constant voltage mode and regulates the voltage VOUT across the battery to be the VREG voltage of five volts. If, for example, VOUT_MIN is 2.0 volts, then VFB_MIN is equal to 1.6 volts according to Equation (4) below. Because terminal FB 319 is used to supply power to amplifier circuit 312 and 313, the low-voltage current control (LVCC) circuit 406 is provided to ensure foldback current regulation when supply voltage VFB is low (for instance, lower than 1.6 volts).

VFB with reference to SENSE terminal 323 is given by:

$$VFB=(VOUT-IFB*RFB1)*RFB2/(RFB1+RFB2) \quad (4)$$

VFB with reference to SOURCE terminal 322 is given by:

$$VFB=(VOUT-IFB*RFB1)*RFB2/(RFB1+RFB2)+ \\ IOUT*RSENSE \quad (5)$$

Accordingly, there is slightly more operating voltage range in the CC mode than in the CV mode because secondary side controller 303 uses SOURCE terminal 322 instead of SENSE terminal 323 as its power supply return. For example, if IOUT*RSENSE is equal to two hundred millivolts in the CC mode, then VFB (with respect to SOURCE terminal 322) is two hundred millivolts higher than VFB (with respect to SENSE terminal 323). As a result, VOUT_MIN is lowered by approximately two hundred millivolts.

Although certain specific exemplary embodiments are described above in order to illustrate the invention, the invention is not limited to the specific embodiments. The secondary side constant voltage and constant current controller 303 described above is not limited to flyback power supplies. It can be applied to a wide range of power supplies, converters, regulators, chargers, adapters, sources, and references. Accordingly, various modifications, adaptations, and combinations of various features of the described embodiments can be practiced without departing from the scope of the invention as set forth in the claims.

What is claimed is:

1. An integrated circuit comprising:
a first terminal;
a second terminal;
a third terminal;
a fourth terminal;
a first amplifier circuit that senses an overvoltage condition on the first terminal and in response causes a first current to flow through the fourth terminal; and
a second amplifier circuit that senses a voltage difference between a voltage on the second terminal and a voltage on the third terminal and causes a second current to flow through the fourth terminal if the voltage difference is above a predetermined voltage, wherein the first and second amplifier circuits are powered by a supply current received onto the integrated circuit through the first terminal.

2. The integrated circuit of claim 1, wherein the overvoltage condition is a condition in which a voltage on the first terminal is greater than a predetermined voltage.

3. The integrated circuit of claim 1, wherein the integrated circuit is disposed in an integrated circuit package, and wherein the integrated circuit package has no more than four terminals.

4. The integrated circuit of claim 1, wherein the first amplifier circuit draws the first current through the fourth terminal by coupling the fourth terminal to another terminal of the integrated circuit, and wherein the second amplifier circuit draws the second current through the fourth terminal to said another terminal of the integrated circuit.

5. The integrated circuit of claim 4, wherein said another terminal is the third terminal.

6. The integrated circuit of claim 1, wherein the first amplifier circuit comprises:
a first error amplifier;
a voltage reference circuit, wherein the voltage reference circuit supplies a reference voltage onto a first differential input lead of the first error amplifier; and
a voltage divider network that is coupled to the first terminal, wherein a fraction of a voltage on the first terminal is supplied by the voltage divider network onto a second differential input lead of the first error amplifier.

7. The integrated circuit of claim 6, wherein the first amplifier circuit further comprises:
an under-voltage-lock-out (UVLO) circuit that disables the first error amplifier if the voltage on the first terminal is below a UVLO threshold voltage.

8. The integrated circuit of claim 6, wherein the second amplifier circuit comprises:
a second error amplifier, wherein the second terminal is coupled to a first differential input lead of the second error amplifier; and
a voltage reference circuit having a first node and a second node, wherein the first node is coupled to the third terminal, wherein the second node is coupled to a second differential input node of the second error amplifier.

9. A method, comprising:
using a first terminal on an integrated circuit package to sense a first voltage in a voltage control feedback loop, wherein the first voltage is sensed by a first error amplifier that is part of an integrated circuit that is packaged in the package;
using the first terminal to receive power onto the integrated circuit and to power the first error amplifier; and
using a second terminal and a third terminal on the integrated circuit package to sense a second voltage between a voltage on the second terminal and a voltage on the third terminal in a current control feedback loop, wherein the second voltage is sensed by a second error amplifier that is part of the integrated circuit, wherein the first terminal is also used to power the second error amplifier.

10. The method of claim 9, further comprising:
using a fourth terminal on the integrated circuit package to provide a common current sink output in the voltage control feedback loop and the current control feedback loop, wherein the common current sink output flows from the fourth terminal to the third terminal, and wherein the third terminal is also used as power supply return for the integrated circuit.

11. The method of claim 10, wherein the integrated circuit package has no more than four terminals.

12. A power supply device having a first power supply terminal and a second power supply terminal, wherein an output voltage is present between the first and second power supply terminals, and wherein the power supply device supplies an output current through the first power supply terminal, the power supply device comprising:
a primary side controller;
an optocoupler that provides a feedback signal to the primary side controller; and
a secondary side constant voltage and constant current controller disposed in an integrated circuit package having no more than four terminals, wherein the secondary side controller is part of a voltage control feedback loop that provides feedback to the optocoupler to regulate the output voltage in a constant voltage (CV) mode, and wherein the secondary side controller is part of a current control feedback loop that provides feedback to the optocoupler to regulate the output current in constant current (CC) mode.

13. The power supply device of claim 12, wherein a voltage divider network is coupled to the first and second power supply terminals and has a tap, wherein the voltage control feedback loop extends from the tap, through a first terminal of the integrated circuit package, through a first amplifier circuit of the secondary side controller, through a second terminal of the integrated circuit package, through the optocoupler, and to the primary side controller.

14. The power supply device of claim 13, wherein a sense resistor is coupled between a third terminal and a fourth terminal of the integrated circuit package, wherein the current control feedback loop extends from one of the terminals coupled to the sense resistor, through a second amplifier circuit of the secondary side controller, through the second terminal of the integrated circuit package, through the optocoupler, and to the primary side controller.

15. The power supply device of claim 14, wherein the first and second amplifier circuits are powered by a supply current received onto the integrated circuit package through the first terminal.

16. The power supply of claim 13, wherein the secondary side controller is operable in a constant voltage (CV) mode or a constant current (CC) mode.

17. A constant voltage (CV) and constant current (CC) controller integrated circuit, comprising:
a voltage control loop amplifier that causes a first current to flow through a first terminal if a voltage on a second terminal exceeds a first predetermined voltage in a constant voltage operating mode of the integrated circuit, wherein the second terminal is electrically coupled to a secondary winding of a power converter from which an output current flows;
a current control loop amplifier that causes a second current to flow through the first terminal if a voltage between a third terminal and a fourth terminal exceeds a second predetermined voltage in a constant current operating mode of the integrated circuit, wherein the first terminal, second terminal, third terminal and fourth terminals are terminals of the integrated circuit; and
means for powering the voltage control loop amplifier and the current control loop amplifier by receiving a supply current through the second terminal.

18. The constant voltage (CV) and constant current (CC) controller integrated circuit of claim 17, wherein the means is a connection from the second terminal to a power supply input lead of the voltage control loop amplifier and to a power supply input lead of the current control loop amplifier.

19. The constant voltage (CV) and constant current (CC) controller integrated circuit of claim 17, wherein the integrated circuit is packaged in an integrated circuit package, and wherein the integrated circuit package has no more than four terminals.

20. The integrated circuit of claim 1, wherein the first terminal is electrically coupled to a secondary winding of a power converter.

21. The integrated circuit of claim 1, wherein the integrated circuit is part of a flyback converter having a primary side and a secondary side, and wherein none of the first, second, third or fourth terminals is electrically coupled to the primary side of the flyback converter.

* * * * *